United States Patent
Chang et al.

(10) Patent No.: US 9,367,192 B2
(45) Date of Patent: Jun. 14, 2016

(54) SURFACE CAPACITIVE TOUCH PANEL AND METHOD OF DETERMINING TOUCH COORDINATE POSITION

(71) Applicant: MIDAS TECHNOLOGY INC., Taipei (TW)

(72) Inventors: Da-Lee Chang, Taipei (TW); Wu-Tung Kao, Taipei (TW); Chien-Hao Huang, Taipei (TW)

(73) Assignee: MIDAS TECHNOLOGY INC., Taipei (TW)

( * ) Notice: Subject to any disclaimer, the term of this patent is extended or adjusted under 35 U.S.C. 154(b) by 37 days.

(21) Appl. No.: 14/523,301

(22) Filed: Oct. 24, 2014

(65) Prior Publication Data

US 2016/0117011 A1    Apr. 28, 2016

(51) Int. Cl.
*G06F 3/041* (2006.01)
*G06F 3/044* (2006.01)

(52) U.S. Cl.
CPC ..................................... *G06F 3/044* (2013.01)

(58) Field of Classification Search
CPC ....... G06F 3/044; G06F 3/0416; G06F 19/00; H05K 2201/09681; H05K 2201/10128; H05K 3/107; H05K 3/1258; H05K 3/4611; Y10T 29/49105; H03K 17/962; H03K 2217/960725; H03K 2217/960775; G01R 29/24; G01R 27/26

USPC ................... 345/173–178; 178/18.03, 18.06; 324/658–690
See application file for complete search history.

(56) References Cited

U.S. PATENT DOCUMENTS

| 2012/0188195 A1* | 7/2012 | Fang .................. G01R 31/2832 345/174 |
| 2013/0262004 A1* | 10/2013 | Hargreaves .......... H03K 17/962 702/64 |

* cited by examiner

*Primary Examiner* — Kent Chang
*Assistant Examiner* — Nelson Rosario
(74) *Attorney, Agent, or Firm* — Locke Lord LLP; Tim Tingkang Xia, Esq.

(57) ABSTRACT

A surface capacitive touch panel including a panel body, four electrodes, a power supply module, a grounding and measuring module, and a computation control module. The electrodes are disposed on four sides of the panel body, respectively, and each have a first end portion and a second end portion. In response to a control signal, the power supply module selects one of the electrodes to function as an electrode under test. The power supply module connects with the first end portion of the electrode under test to supply a power to the electrode under test. The grounding and measuring module connects with the second end portion of the electrode under test to create a grounded loop for measuring currents under test. The computation control module computes touch coordinate positions with values of currents under test measured at the electrodes. Hence, single-touch and multi-touch coordinate positions are accurately determined.

15 Claims, 5 Drawing Sheets

SURFACE CAPACITIVE TOUCH PANEL AND METHOD OF DETERMINING TOUCH COORDINATE POSITION

FIELD OF THE INVENTION

The present invention relates to touch panels, and more particularly, to a multi-touch surface touch panel.

BACKGROUND OF THE INVENTION

Conventional capacitive touch panels come in two types: surface capacitive touch panels and projective capacitive touch panels.

A conventional surface capacitive touch panel operates in a manner described below. An induced current is produced as a result of a capacitive change arising from the capacitive coupling which happens as soon as a user's fingertip comes into contact with the touch panel. Then, the induced current exits electrodes disposed at the four corners of the touch panel, respectively. Afterward, the current strength at the four corners of the touch panel are compared with a controller to thereby calculate touch position coordinates. However, due to their structural limits, the conventional surface touch panels are restricted to single touch as opposed to multi-touch; as a result, the conventional surface touch panels are incapable of identifying two or more touch positions concurrently, thereby putting a limit on the application of the conventional surface touch panels.

On the contrary, the conventional projective capacitive touch panels attain multi-touch with interlaced arrays formed from multiple ITO layers. However, the conventional projective capacitive touch panels are each characterized by a multilayer structure in order to effectuate multi-touch; as a result, the conventional projective capacitive touch panels incur higher manufacturing costs than the conventional surface capacitive touch panels.

SUMMARY OF THE INVENTION

It is an objective of the present invention to provide a surface capacitive touch panel capable of multi-touch.

Another objective of the present invention is to provide a method of determining a touch coordinate position to enable a surface capacitive touch panel to achieve multi-touch.

In order to achieve the above and other objectives, the present invention provides a surface capacitive touch panel which comprises a panel body, four electrodes, a power supply module, a grounding, a measuring module, and a computation control module. The electrodes are disposed on four sides of the panel body, respectively, and each have a first end portion and a second end portion. In response to a control signal, the power supply module selects one of the electrodes to function as an electrode under test. The power supply module connects with the first end portion of the electrode under test to supply a power to the electrode under test. The grounding and measuring module is grounded and, in response to the control signal, connects with the second end portion of the electrode under test to create a grounded loop for measuring currents under test passing through the electrode under test and send the measured value of a current under test. The computation control module computes touch coordinate positions with values of currents under test measured at the electrodes. The computation control module is connected to the first power supply module, the second power supply module, the first grounding and measuring module, and the second grounding and measuring module and adapted to generate the control signal whereby the computation control module takes turns selecting any one of the end portions of the electrodes to function as the first end portion for receiving the measured values of the first current under test and the second current under test of the electrodes from the first grounding and measuring module and the second grounding and measuring module, respectively, and then computing touch coordinate positions.

In an embodiment, the power supply module comprises a power supply unit and a first switching unit. The power supply unit generates the power. The first switching unit is connected to the power supply unit and the first end portion of the electrode under test and connected between the power supply unit and the electrode under test.

In an embodiment, the grounding and measuring module comprises a second switching unit, a grounding unit, and a measuring unit. The second switching unit is connected to the second end portion of the electrode under test. The grounding unit has a measuring end portion and a grounding end portion. The measuring end portion connects with the second switching unit. The measuring unit is connected to the measuring end portion and adapted to measure the currents under test.

In an embodiment, the grounding and measuring module comprises a second switching unit, a grounding unit, and a measuring unit. The second switching unit is connected to the second end portion of the electrode under test. The grounding unit has two end portions. One of the end portions connects with the second switching unit. The other one of the end portions is grounded. The measuring unit connects with a measurement point of the electrode under test so as to measure the values of the currents under test.

In order to achieve the above and other objectives, the present invention further provides a surface capacitive touch panel comprising a panel body, four electrodes, a first power supply module, a first grounding and measuring module, a second power supply module, a second grounding and measuring module and a computation control module. The electrodes are disposed on four sides of the panel body, respectively, and each have a first end portion and a second end portion. The first power supply module connects selectively with one of the electrodes in response to a control signal, wherein the selected electrode functions as a first electrode under test, and the first power supply module connects with the first end portion of the first electrode under test so as to supply a first power to the first electrode under test. The first grounding and measuring module is grounded and adapted to select the first electrode under test from the electrodes in response to the control signal, wherein the first grounding and measuring module connects with the second end portion of the first electrode under test to create a grounded loop for measuring a first current under test passing through the first electrode under test and send a measured value of the first current under test. The second power supply module is connected, in response to a control signal, to an electrode different from the first electrode under test such that the electrode functions as a second electrode under test, wherein the second power supply module connects with the first end portion of the second electrode under test to supply a second power to the second electrode under test. The second grounding and measuring module is grounded and adapted to select the second electrode under test from the electrodes in response to the control signal, wherein the second grounding and measuring module connects with the second end portion of the second electrode under test to create a grounded loop for measuring a second current under test passing through the second electrode under test and send a measured value of the second current under test. The computation control module is connected to the first power supply module, the second power supply module, the first grounding and measuring module, and the second grounding and measuring module and adapted to generate the control signal whereby the computation control module takes turns selecting any one of the end portions of the electrodes to function as the first end portion for receiving the measured values of the first current under test and the second current under test of the electrodes from the first grounding and measuring module and the second grounding and measuring module, respectively, and then computing touch coordinate positions.

In an embodiment, the first power supply module comprises a power supply unit and a first switching unit. The power supply unit generates the power. The first switching unit is connected to the power supply unit and the first end portion of the first electrode under test and connected between the power supply unit and the first electrode under test.

In an embodiment, the first grounding and measuring module comprises a second switching unit, a grounding unit, and a measuring unit. The second switching unit is connected to the second end portion of the first electrode under test. The grounding unit hays a measuring end portion and a grounding end portion. The measuring end portion connects with the second switching unit. The measuring unit connects with the measuring end portion so as to measure the first current under test.

In an embodiment, the first grounding and measuring module comprises a second switching unit, a grounding unit, and a measuring unit. The second switching unit is connected to the second end portion of the electrode under test. The grounding unit has two end portions. One of the end portions connects with the second switching unit. The other one of the end portions is grounded. The measuring unit is connected to a measurement point of the first electrode under test and adapted to measure the first current under test.

In an embodiment, the second power supply module comprises a power supply unit and a first switching unit. The power supply unit generates the power. The first switching unit is connected to the power supply unit and the first end portion of the second electrode under test and connected between the power supply unit and the second electrode under test.

In an embodiment, the second grounding and measuring module comprises a second switching unit, a grounding unit, and a measuring unit. The second switching unit is connected to the second end portion of the second electrode under test. The grounding unit has a measuring end portion and a grounding end portion. The measuring end portion connects with the second switching unit. The measuring unit connects with the measuring end portion so as to measure the second current under test.

In an embodiment, the second grounding and measuring module comprises a second switching unit, a grounding unit, and a measuring unit. The second switching unit is connected to the second end portion of the electrode under test. The grounding unit has two end portions. One of the end portions connects with the second switching unit. The other one of the end portions is grounded. The measuring unit is connected to a measurement point of the second electrode under test and adapted to measure the second current under test.

In order to achieve the above and other objectives, the present invention provides a method of determining a touch coordinate position and determining a touch coordinate position on the surface capacitive touch panel. The method comprises the steps of: S10 (the step of measuring currents under test): measuring currents under test passing through the electrodes; S12 (the step of analyzing the total current under test): comparing a sum of the currents under test with a predetermined reference total current. The process flow of the method goes to S14 when it is determined that the sum of the currents under test is larger than the reference total current; S14 (the step of confirming a center coordinate position): calculating a center coordinate position between multi-touch coordinate positions in accordance with the currents under test; and S16 (the step of confirming multi-touch coordinate positions): calibrating the center coordinate position to determine the touch coordinate position.

In an embodiment, when the sum of the currents under test is not larger than the reference total current, the process flow of the method goes to S24 which entails calculating a touch coordinate position in accordance with the currents under test.

Accordingly, the surface capacitive touch panel of the present invention is characterized advantageously in that: eight induced currents are generated from the four corners of a panel body of the surface capacitive touch panel as soon as a fingertip touches the panel body, and then the touch coordinate positions on the surface capacitive touch panel are calculated in accordance with the strength of the induced currents, such that single-touch and multi-touch coordinate positions are accurately determined. Hence, the surface capacitive touch panel of the present invention has wider applications than conventional surface capacitive touch panels.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
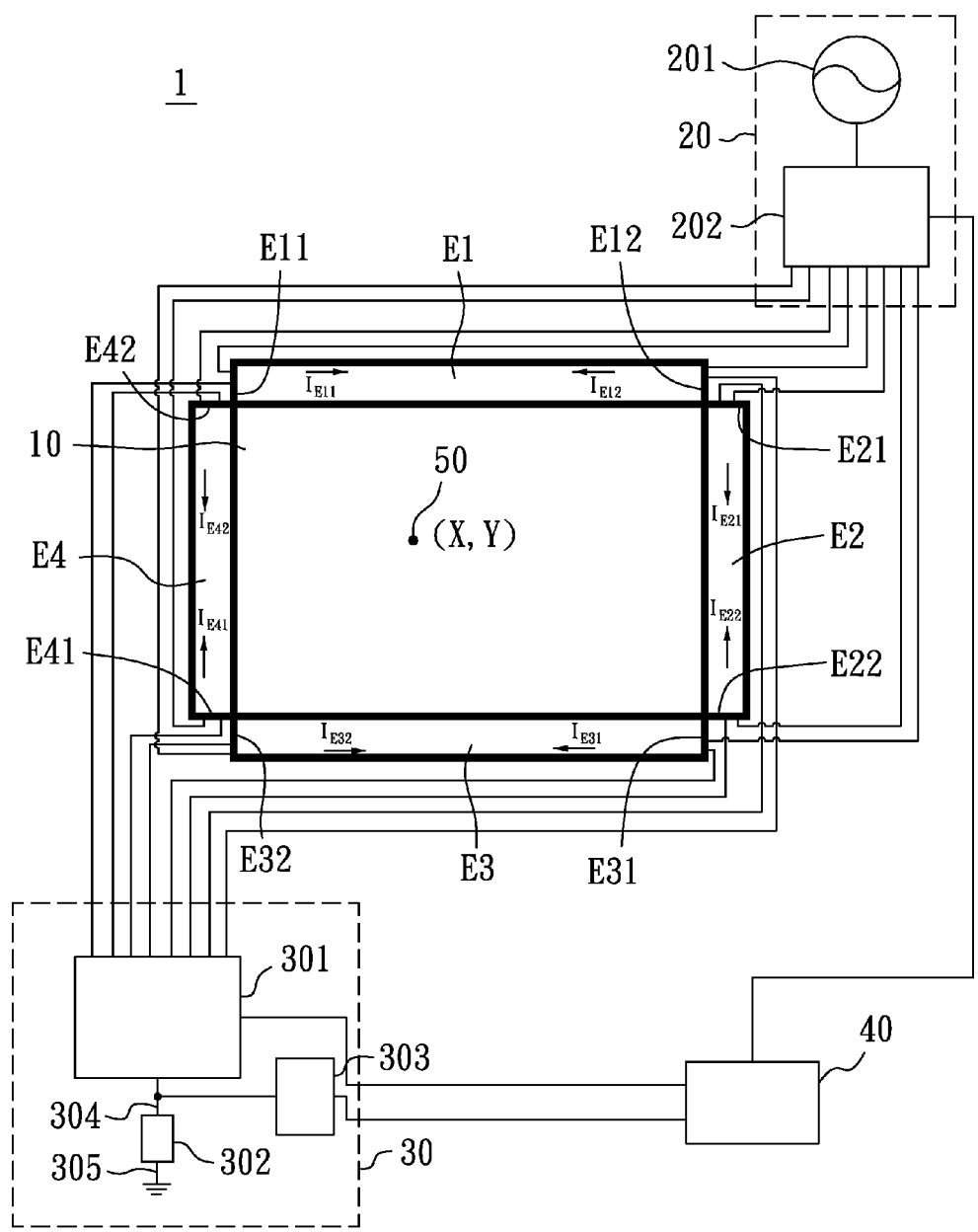
FIG. 1 is a schematic view of a surface capacitive touch panel according to the first embodiment of the present invention.

Referring to FIG. 1, there is shown a schematic view of a surface capacitive touch panel 1 according to the first embodiment of the present invention. The surface capacitive touch panel 1 comprises a panel body 10, a first electrode E1, a second electrode E2, a third electrode E3, a fourth electrode E4, a power supply module 20, a grounding and measuring module 30, and a computation control module 40.

The panel body 10 of the surface capacitive touch panel 1 is adapted to be touched by a user (not shown). The first electrode E1, the second electrode E2, the third electrode E3, and the fourth electrode E4 surround the panel body 10. The first electrode E1 has two end portions E11, E12. The second electrode E2 has two end portions E21, E22. The third electrode E3 has two end portions E31, E32. The fourth electrode E4 has two end portions E41, E42. A uniform electrical field is provided on the panel body 10 of the surface capacitive touch panel 1. A capacitive charging effect occurs as soon as the user's fingertip or stylus touches the panel body 10, such that an ensuing capacitive change happens to the first electrode E1, the second electrode E2, the third electrode E3, and the fourth electrode E4. At this point in time, the computation control module 40 sends a control signal to the power supply module 20 to instruct the power supply module 20 to supply a power to one of the electrodes. In this embodiment, the end portions E11, E12, E21, E22, E31, E32, E41, E42 are switchably connected to the power supply module 20. The grounding and measuring module 30 measures the currents passing through the first electrode E1, the second electrode E2, the third electrode E3, and the fourth electrode E4, respectively.

The computation control module 40 connects with the power supply module 20 and the grounding and measuring module 30. The computation control module 40 generates the control signal to switch between the power supply module 20 and the grounding and measuring module 30 for creating a connection with an intended electrode. The computation control module 40 uses the control signal to take turns selecting any one of end portion E11, E12, E21, E22, E31, E32, E41, E42 of the electrode E1, E2, E3, E4 so as for the power supply module 20 to supply power to the selected end portion and selecting a corresponding end portion to be connected to the grounding and measuring module 30. In doing so, the computation control module 40 receives measured values of two currents under test of the electrodes E1, E2, E3, E4 (each electrode has two currents under test measured in two directions, respectively, and thus there are eight currents under test in total) from the grounding and measuring module 30, and then computes every touch coordinate position. The aforesaid operation of the computation control module 40 is further described below.

The computation control module 40 takes turns controlling the power supply module 20 and the grounding and measuring module 30 to connect with one of the electrodes E1, E2, E3, E4 and receives the measured values of two currents passing through each electrode. The description below is exemplified by the first electrode E1, wherein the end portion E11 of the first electrode E1 admits a current IE11, and the end portion E12 of the first electrode E1 admits a current IE12. To measure the current IE11, the power supply module 20 operates under the control of the control signal generated from the computation control module 40 so as to connect with the end portion E11, whereas the grounding and measuring module 30 connects with the end portion E12 to create a route of electrical conduction. The current IE11 exits the power supply module 20, passes through the first electrode E1, and ends up in the grounding and measuring module 30. Hence, the grounding and measuring module 30 can measure the current IE11 passing through the first electrode E1. To measure the current IE12, the power supply module 20 operates under the control of the control signal generated from the computation control module 40 so as to connect with the end portion E12, whereas the grounding and measuring module 30 connects with the end portion E11 to create a route of electrical conduction. The current IE12 exits the power supply module 20, passes through the first electrode E1, and ends up in the grounding and measuring module 30. Hence, the grounding and measuring module 30 can measure the current IE12 passing through the first electrode E1. Likewise, the computation control module 40 also receives the measured values of currents IE21, IE22 passing through the second electrode E2, currents IE31, IE32 passing through the third electrode E3, and currents IE41, IE42 passing through the fourth electrode E4. At last, the computation control module 40 receives the measured values of eight currents in total.

In this embodiment, the power supply module 20 comprises a power supply unit 201 and a first switching unit 202. The power supply unit 201 supplies the power to the electrodes. In this embodiment, the power supply unit 201 comes in the form of an AC power supply unit for supplying an AC power. Depending on the current to be measured, the first switching unit 202 is programmable to selectively connect with one of the end portions E11, E12, E21, E22, E31, E32, E41, E42 so as to supply the power to the end portion thus selected.

In this embodiment, the grounding and measuring module 30 comprises a second switching unit 301, a grounding unit 302 and a measuring unit 303. Likewise, the second switching unit 301 is programmable to selectively switch between the electrodes to connect thereto and connect with another end portion of the electrode in accordance with the end portion of the electrode connected to the first switching unit 202 so as to create a route of electrical conduction. The grounding unit 302 has a measuring end portion 304 and a grounding end portion 305. The measuring end portion 304 connects with the second switching unit 301. The grounding end portion 305 is grounded. The measuring unit 303 connects with the measuring end portion 304 so as to measure any current conveyed through the route of electrical conduction. Persons skilled in the art understand that the grounding unit 302 comes in the form of a physical grounded loop composed of a resistor, a capacitor, and the like, and understand that whatever circuit layout conducive to the formation of a physical grounded loop should fall within the scope of the present invention.

Given the aforesaid measured values of the eight currents under test (each electrode has two currents which flow in two directions, respectively, and thus it is necessary to measure the two currents under test of each electrode) passing through the electrodes, as soon as the user's fingertip or stylus touches a touch position 50 of the panel body 10, the measured values of the currents under test can be substituted into the two equations below in order to calculate the coordinate position (X, Y) of the touch position 50.

$$X=[(IE41+IE42)-(IE21+IE22)]/(IE41+IE42+IE21+IE22)$$

$$Y=[(IE11+IE12)-(IE31+IE32)]/(IE11+IE12+IE31+IE32)$$

Figure 2:
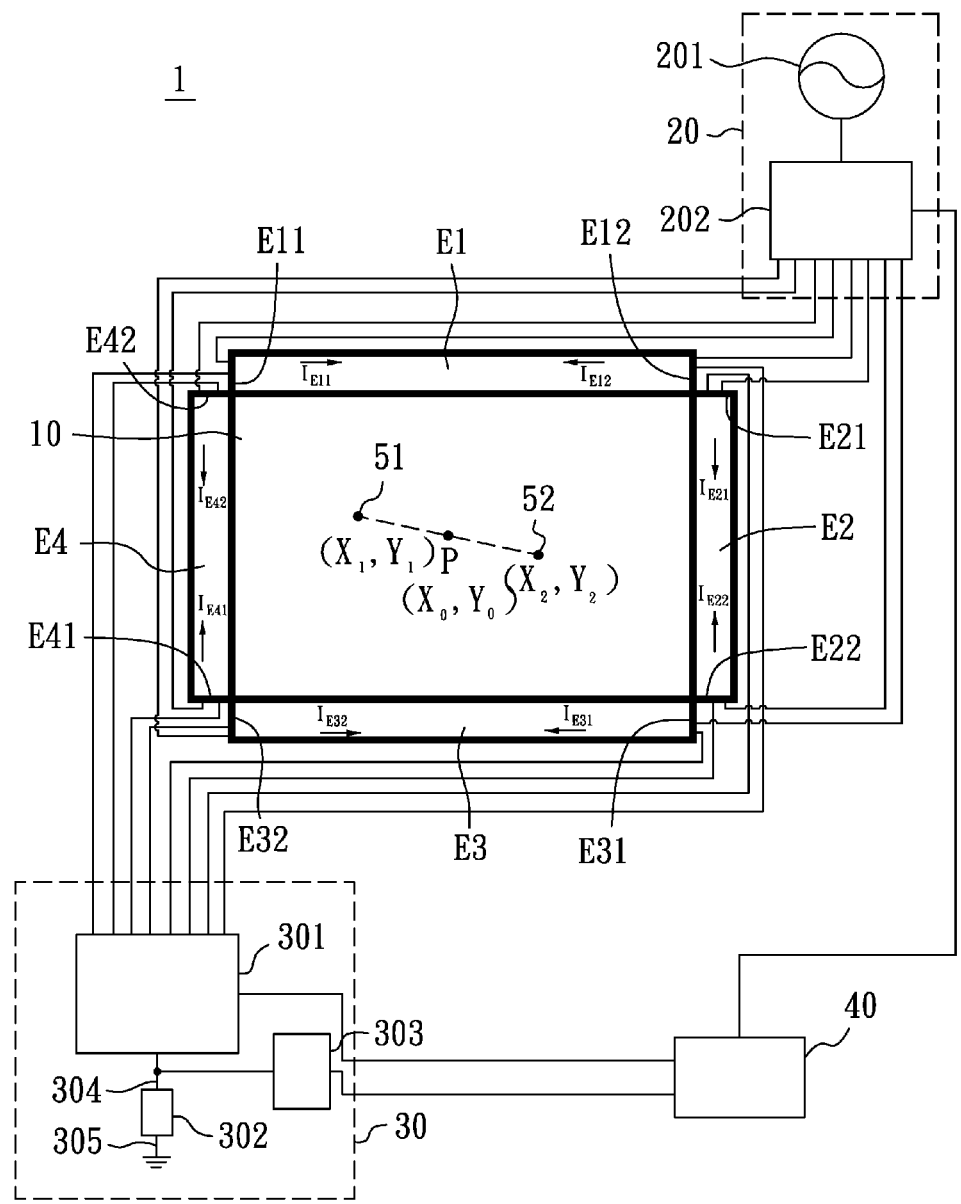
FIG. 2 is a schematic view of the surface capacitive touch panel according to the second embodiment of the present invention.

Referring to FIG. 2, there is shown a schematic view of the surface capacitive touch panel 1 according to the second embodiment of the present invention. The sum of the currents IE11, IE12, IE21, IE22, IE31, IE32, IE41, IE42 in case of two touch positions 51, 52 on the panel body 10 is larger than the sum of the currents IE11, IE12, IE21, IE22, IE31, IE32, IE41, IE42 in case of one touch position on the panel body 10; hence, the surface capacitive touch panel 1 confirms multi-touch. In this regard, the sum of currents in the case of a single touch position can also function as a reference total current for determining whether multi-touch is taking place, but the present invention is not limited thereto, as it is also feasible for the reference total current to be predetermined.

After the values of the currents IE11, IE12, IE21, IE22, IE31, IE32, IE41, IE42 have been measured, the coordinate positions calculated with the aforesaid two equations become the coordinate position (X0,Y0) of a central position P of the touch positions 51, 52, whereas coordinate positions (X1, Y1), (X2,Y2) of the touch positions 51, 52 are calculated with the equations below.

$$\Delta X = fx[X0, Y0, (IE41+IE42+IE21+IE22)/IT]$$

$$\Delta Y = fy[X0, Y0, (IE11+IE12+IE31+IE32)/IT]$$

$$X1 = X0 - \Delta X/2$$

$$X2 = X0 + \Delta X/2$$

$$Y1 = Y0 - \Delta Y/2$$

$$Y2 = Y0 + \Delta Y/2$$

where IT=IE11+IE12+IE21+IE22+IE31+IE32+IE4+IE42, $\Delta X = X1-X2$, $\Delta Y = Y1-Y2$, and fx and fy are generated by calibration. Persons skilled in the art understand that the fx and fy generated by calibration vary from panel to panel in terms of the raw material, size, and shape of the panels.

In conclusion, the surface capacitive touch panel of the present invention is characterized advantageously in that single-touch and multi-touch coordinate positions on a panel body are calculated in accordance with measured values of eight currents under test.

Figure 3:
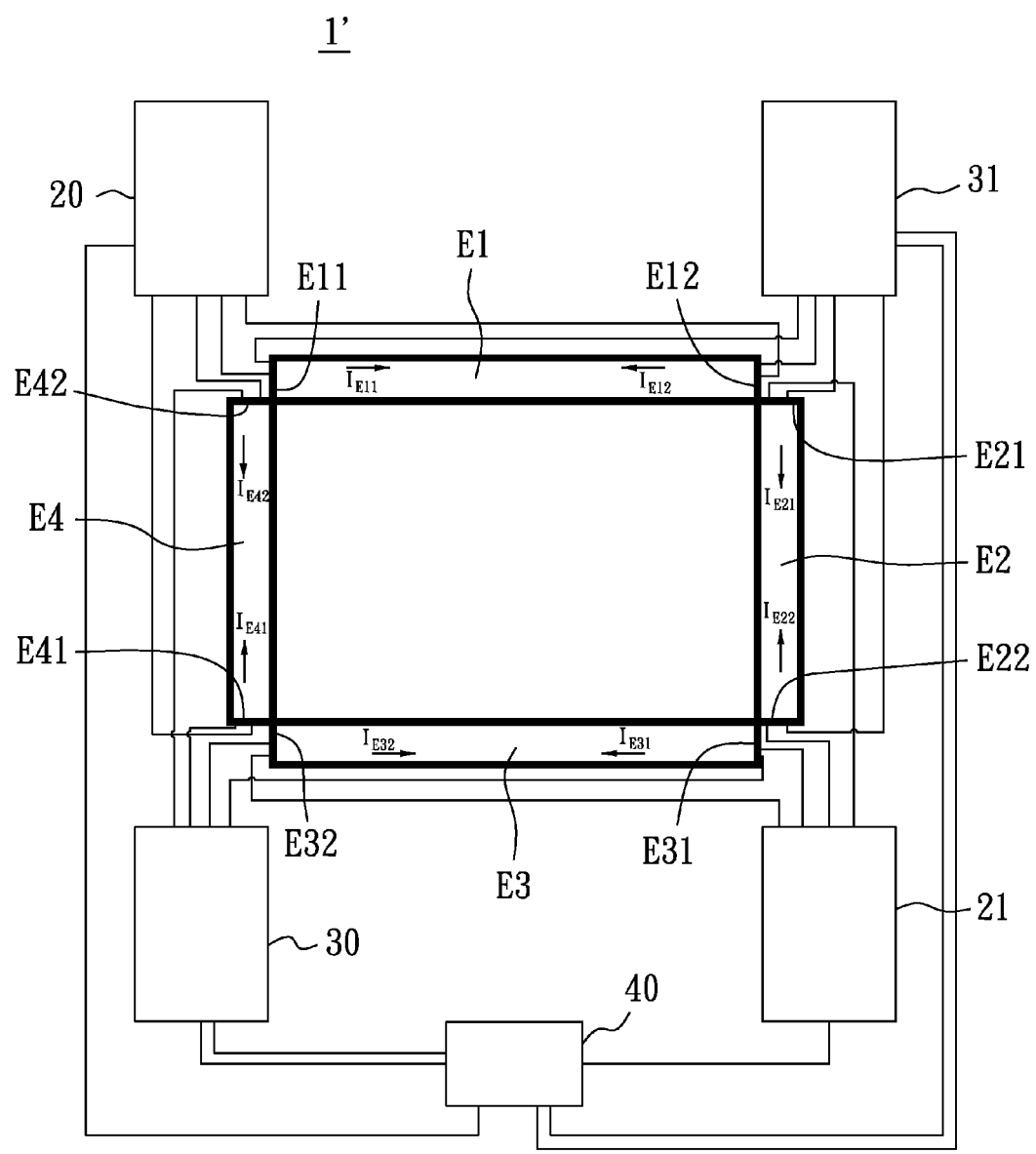
FIG. 3 is a schematic view of another surface capacitive touch panel according to a variant embodiment of the present invention.

Referring to FIG. 3, there is shown a schematic view of a surface capacitive touch panel 1' according to a variant embodiment of the present invention. As compared to the surface capacitive touch panel 1, the surface capacitive touch panel 1' has two power supply modules 20, 21 and two grounding and measuring modules 30, 31, wherein both the power supply module and the grounding and measuring module connect with the computation control module 40. In this embodiment, the power supply module 20 connects with the end portions E11, E12, E41, E42; the power supply module 21 connects with the end portions E21, E22, E31, E32; the grounding and measuring module 30 connects with the end portions E31, E32, E41, E42; and the grounding and measuring module 31 connects with the end portions E11, E12, E21, E22. Hence, the surface capacitive touch panel 1' measures two currents under test simultaneously, for example, by connecting the power supply module 20 to the end portion E42 and connecting the grounding and measuring module 30 to the end portion E41 in order to measure the current under test IE42, and by connecting the power supply module 21 to the end portion E22 and connecting the grounding and measuring module 31 to the end portion E21 in order to measure the current under test IE22. The quantity of the power supply modules, the quantity of the grounding and measuring modules, the way of connecting the power supply modules to the end portions, and the way of connecting the grounding and measuring modules to the end portions are subject to changes as needed or in accordance with the requirements of circuit layout.

In conclusion, the surface capacitive touch panel 1' of the present invention not only measures single-touch and multi-touch coordinate positions on a panel body in accordance with measured values of eight currents under test but also demonstrates higher efficiency of measurement than the surface capacitive touch panel 1.

Figure 4:
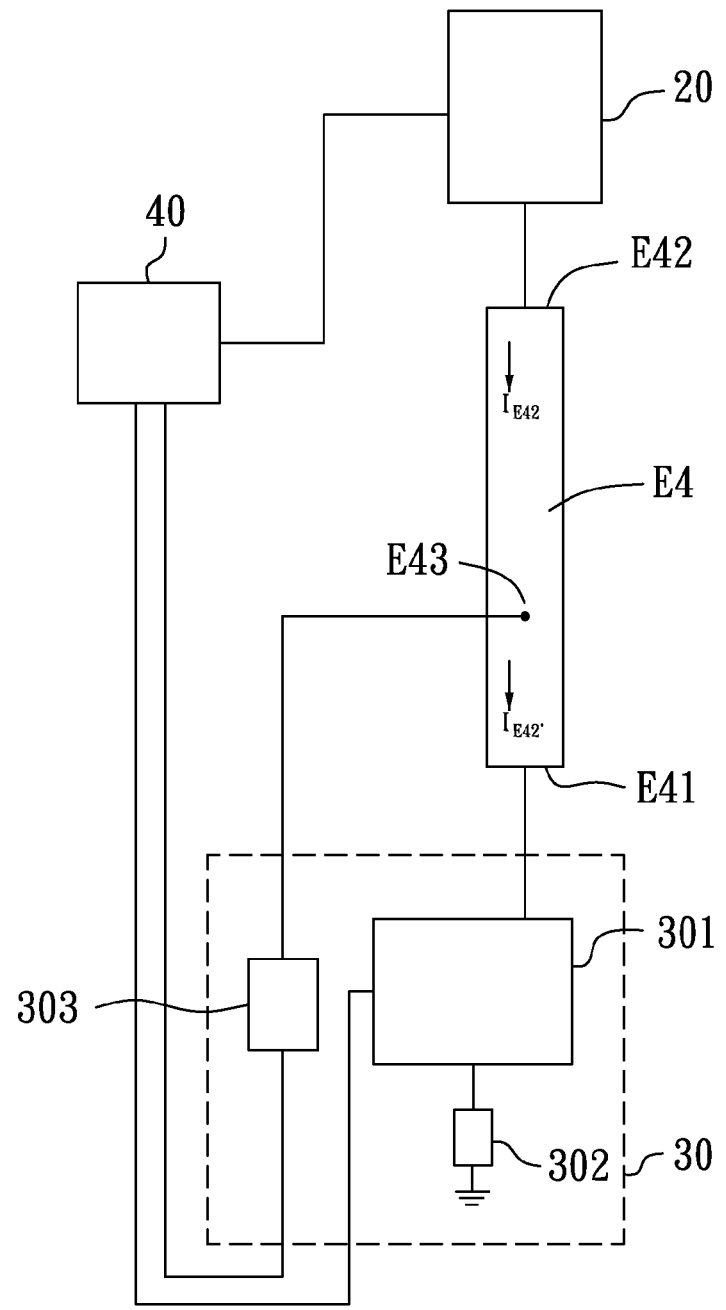
FIG. 4 is a schematic view of a measuring unit measuring currents under test according to a variant embodiment of the present invention.

Referring to FIG. 4, there is shown a schematic view of a measuring unit measuring currents under test according to a variant embodiment of the present invention. In the preceding embodiments, currents under test are measured at an end portion 304 of the grounding unit 302. On the contrary, in the embodiment illustrated with FIG. 4, currents under test of an electrode under test are measured at a measurement point (which is different from an end portion of the electrode under test, wherein the power supply module 20 connects with the end portion of the electrode under test) which can be any point on the electrode under test. The description below is exemplified by the fourth electrode E4.

Under the control of the computation control module 40, the power supply module 20 and the grounding and measuring module 30 connect with end portion E42 and end portion E41 of the fourth electrode E4, respectively, to measure the current under test IE42. As compared to the other embodiments, this embodiment is characterized in that: the measuring unit 303 connects with a measurement point E43 of the fourth electrode E4, wherein the measurement point E43 is positioned between the end portion E41 and the end portion E42. The position of the measurement point E43 is subject to changes in accordance with circuit layout or circuit specifications. Whatever position (on the fourth electrode E4) other than the end portion E41, E42 may function as the measurement point. The measuring unit 303 retrieves the current under test IE42 through the measurement point E43 to thereby measure the current under test. Although this embodiment has a drawback, that is, a leak current IE42' occurs to the aforesaid measurement point, persons skilled in the art are aware that the leak current IE42' is far less than the current under test IE42 and thus the outcome of the leak current IE42' is negligible. In this embodiment, given the measuring unit 303 and the computation control module 40, it is feasible to measure the seven currents IE11, IE12, IE21, IE22, IE31, IE32, IE41 and then calculate the coordinate positions of a touch on the panel with the above equations.

Figure 5:
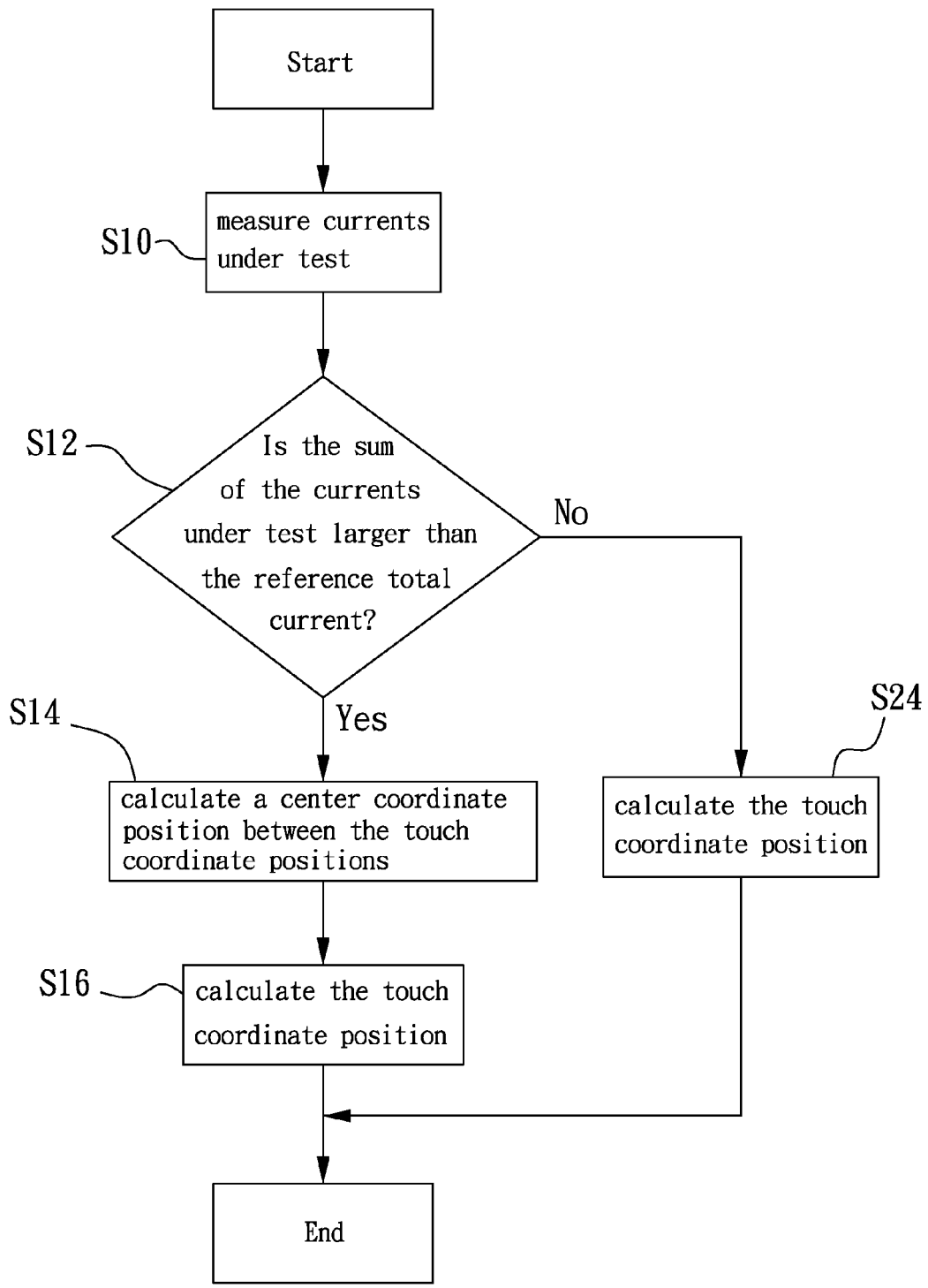
FIG. 5 is a flow chart of a method of determining a touch coordinate position according to the present invention.

Referring to FIG. 5, there is shown a flow chart of a method of determining a touch coordinate position on a surface capacitive touch panel according to the present invention. The method comprises the steps of:

S10 (the step of measuring currents under test): measure currents under test passing through the electrodes;

S12 (the step of analyzing the total current under test): compare the sum of the currents under test with a predetermined reference total current. The process flow of the method goes to S14 when it is determined that the sum of the currents under test is larger than the reference total current;

S14 (the step of confirming a center coordinate position): calculate a center coordinate position between multi-touch coordinate positions in accordance with the currents under test; and S16 (the step of confirming multi-touch coordinate positions): calibrate the center coordinate position to determine the touch coordinate position.

When the sum of the currents under test is not larger than the reference total current, the process flow of the method goes to S24.

S24: calculate a single-touch coordinate position in accordance with the currents under test.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A surface capacitive touch panel, comprising:
   a panel body;
   four electrodes disposed on four sides of the panel body, respectively, and each having a first end portion and a second end portion;
   a power supply module connecting selectively with one of the electrodes in response to a control signal, wherein the selected electrode functions as an electrode under test, and the power supply module connects with the first end portion of the electrode under test so as to supply a power to the electrode under test;

a grounding and measuring module grounded and adapted to select an electrode under test from the electrodes in response to the control signal, wherein the grounding and measuring module connects with the second end portion of the electrode under test to create a grounded loop for measuring a current under test passing through the electrode under test and send a measured value of the current under test; and a computation control module connected to the power supply module and the grounding and measuring module and adapted to generate the control signal whereby the computation control module takes turns selecting any one of the end portions of the electrodes to function as the first end portion for receiving the measured values of currents under test of the electrodes from the grounding and measuring module and then computing touch coordinate positions.

2. The surface capacitive touch panel of claim 1, wherein the power supply module comprises:
a power supply unit for generating the power; and
a first switching unit connected to the power supply unit and the first end portion of the electrode under test and connected between the power supply unit and the electrode under test.

3. The surface capacitive touch panel of claim 1, wherein the grounding and measuring module comprises:
a second switching unit connected to the second end portion of the electrode under test;
a grounding unit having a measuring end portion and a grounding end portion, wherein the measuring end portion connects with the second switching unit; and
a measuring unit connected to the measuring end portion and adapted to measure the currents under test.

4. The surface capacitive touch panel of claim 2, wherein the grounding and measuring module comprises:
a second switching unit connected to the second end portion of the electrode under test;
a grounding unit having a measuring end portion and a grounding end portion, wherein the measuring end portion connects with the second switching unit; and
a measuring unit connected to the measuring end portion and adapted to measure the currents under test.

5. The surface capacitive touch panel of claim 1, wherein the grounding and measuring module comprises:
a second switching unit connected to the second end portion of the electrode under test;
a grounding unit having two end portions, wherein one of the end portions connects with the second switching unit, and another one of the end portions is grounded; and
a measuring unit connected to a measurement point of the electrode under test and adapted to measure the currents under test.

6. The surface capacitive touch panel of claim 2, wherein the grounding and measuring module comprises:
a second switching unit connected to the second end portion of the electrode under test;
a grounding unit having two end portions, wherein one of the end portions connects with the second switching unit, and another one of the end portions is grounded; and a measuring unit connected to a measurement point of the electrode under test and adapted to measure the currents under test.

7. A surface capacitive touch panel, comprising:
a panel body;
four electrodes disposed on four sides of the panel body, respectively, and each having a first end portion and a second end portion;
a first power supply module connecting selectively with one of the electrodes in response to a control signal, wherein the selected electrode functions as a first electrode under test, and the first power supply module connects with the first end portion of the first electrode under test so as to supply a first power to the first electrode under test;
a first grounding and measuring module grounded and adapted to select the first electrode under test from the electrodes in response to the control signal, wherein the first grounding and measuring module connects with the second end portion of the first electrode under test to create a grounded loop for measuring a first current under test passing through the first electrode under test and send a measured value of the first current under test;
a second power supply module connected, in response to a control signal, to an electrode different from the first electrode under test such that the electrode functions as a second electrode under test, wherein the second power supply module connects with the first end portion of the second electrode under test to supply a second power to the second electrode under test;
a second grounding and measuring module grounded and adapted to select the second electrode under test from the electrodes in response to the control signal, wherein the second grounding and measuring module connects with the second end portion of the second electrode under test to create a grounded loop for measuring a second current under test passing through the second electrode under test and send a measured value of the second current under test; and
a computation control module connected to the first power supply module, the second power supply module, the first grounding and measuring module, and the second grounding and measuring module and adapted to generate the control signal whereby the computation control module takes turns selecting any one of the end portions of the electrodes to function as the first end portion for receiving the measured values of the first current under test and the second current under test of the electrodes from the first grounding and measuring module and the second grounding and measuring module, respectively, and then computing touch coordinate positions.

8. The surface capacitive touch panel of claim 7, wherein the first power supply module comprises:
a power supply unit for generating the power; and
a first switching unit connected to the power supply unit and the first end portion of the first electrode under test and connected between the power supply unit and the first electrode under test.

9. The surface capacitive touch panel of claim 8, wherein the first grounding and measuring module comprises:
a second switching unit connected to the second end portion of the first electrode under test;
a grounding unit having a measuring end portion and a grounding end portion, wherein the measuring end portion connects with the second switching unit; and
a measuring unit connected to the measuring end portion and adapted to measure the first current under test.

10. The surface capacitive touch panel of claim 8, wherein the first grounding and measuring module comprises:
- a second switching unit connected to the second end portion of the electrode under test;
- a grounding unit having two end portions, wherein one of the end portions connects with the second switching unit, and another one of the end portions is grounded; and
- a measuring unit connected to a measurement point of the first electrode under test and adapted to measure the first current under test.

11. The surface capacitive touch panel of claim 7, wherein the second power supply module comprises:
- a power supply unit for generating the power; and
- a first switching unit connected to the power supply unit and the first end portion of the second electrode under test and connected between the power supply unit and the second electrode under test.

12. The surface capacitive touch panel of claim 11, wherein the second grounding and measuring module comprises:
- a second switching unit connected to the second end portion of the second electrode under test;
- a grounding unit having a measuring end portion and a grounding end portion, wherein the measuring end portion connects with the second switching unit; and
- a measuring unit connected to the measuring end portion and adapted to measure the second current under test.

13. The surface capacitive touch panel of claim 11, wherein the second grounding and measuring module comprises:
- a second switching unit connected to the second end portion of the electrode under test;
- a grounding unit having two end portions, wherein one of the end portions connects with the second switching unit, and another one of the end portions is grounded; and
- a measuring unit connected to a measurement point of the second electrode under test and adapted to measure the second current under test.

14. A method of determining a touch coordinate position, and determining a touch coordinate position on the surface capacitive touch panel of claim 1, the method comprising the steps of:
- S10 (the step of measuring currents under test): measuring currents under test passing through the electrodes;
- S12 (the step of analyzing the total current under test): comparing a sum of the currents under test with a predetermined reference total current, wherein the process flow of the method goes to S14 when it is determined that the sum of the currents under test is larger than the reference total current;
- S14 (the step of confirming a center coordinate position): calculating a center coordinate position between multi-touch coordinate positions in accordance with the currents under test; and
- S16 (the step of confirming multi-touch coordinate positions): calibrating the center coordinate position to determine the touch coordinate position.

15. The method of claim 14, wherein, when the sum of the currents under test is not larger than the reference total current, the process flow of the method goes to S24 which entails calculating a touch coordinate position in accordance with the currents under test.

* * * * *